No. 833,076. PATENTED OCT. 9, 1906.
S. MARCO.
BRAKE.
APPLICATION FILED FEB. 13, 1906.
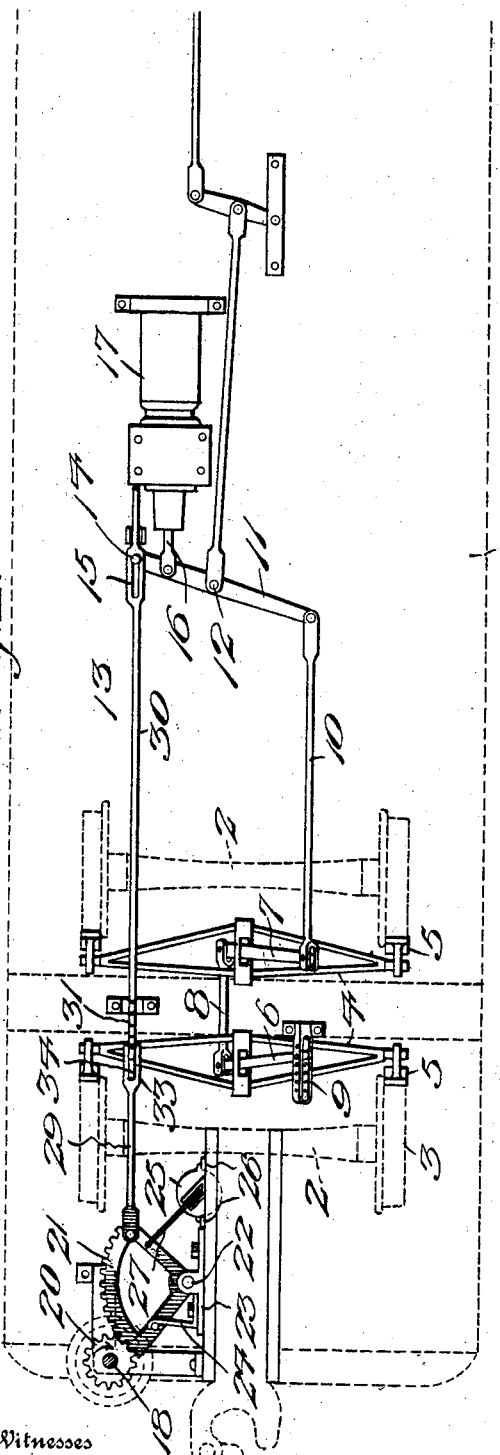
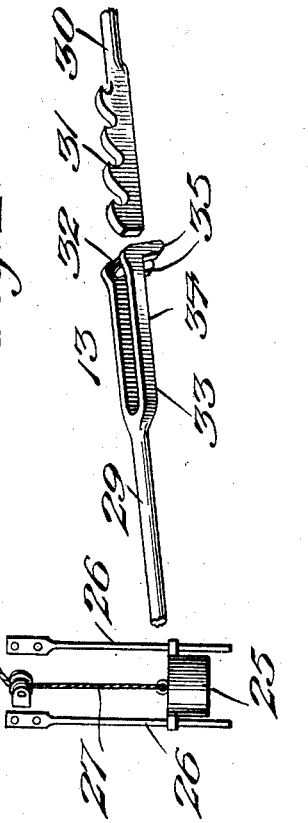
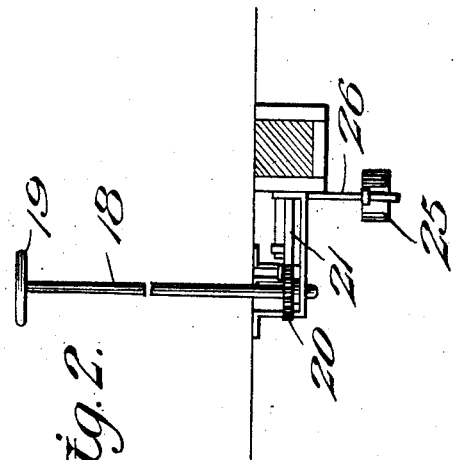
Witnesses
Inventor
Stephen Marco,
By Victor J. Evans
Attorney

UNITED STATES PATENT OFFICE.

STEPHEN MARCO, OF TERCIO, COLORADO.

BRAKE.

No. 833,076.　　　Specification of Letters Patent.　　　Patented Oct. 9, 1906.

Application filed February 13, 1906. Serial No. 300,924.

*To all whom it may concern:*

Be it known that I, STEPHEN MARCO, a citizen of the United States, residing at Tercio, in the county of Las Animas and State of Colorado, have invented new and useful Improvements in Brakes, of which the following is a specification.

This invention relates to brakes designed especially for use upon railway-cars, and has for its objects to produce a comparatively simple inexpensive device of this character which may be readily installed, one wherein the brake mechanism may be readily operated either manually or automatically, one in which the automatic operation of the brake may be effected independently of the manual controlling means, and one in which the parts of the mechanism may be conveniently adjusted for varying the amount of power requisite for moving the brakes.

With these and other objects in view the invention comprises the novel features of construction and combination of parts more fully hereinafter described.

In the accompanying drawings, Figure 1 is a bottom plan view of the brake mechanism embodying the invention and showing the same applied for use. Fig. 2 is a detail front elevation of the rotary operating-shaft and adjacent parts. Fig. 3 is a detail view of the segment-operating weight and its guides. Fig. 4 is a detail perspective view of portions of the traction-rod included in the brake mechanism.

Referring to the drawings, 1 designates a car having axles 2 equipped with wheels 3, these parts, which are conventionally shown herein, being of the usual or any preferred construction and material and adapted to perform their ordinary functions.

Sustained beneath the car in any suitable manner and between the axles 2 is a pair of movable brake-beams 4, equipped with brake-shoes 5, adapted to act upon the wheels, said beams being connected for relative movement through the medium of a pair of levers 6 7, in turn connected by a link 8. The lever 6 is pivoted at its lower end in a fixed bearing 9, while the lower end of lever 7 is connected, by means of a connecting rod or link 10, with one end of a power-lever 11, fulcrumed at its longitudinal center, as at 12, and having its other end connected with the rear end of a traction rod or element 13 by means of a pin 14, arranged to work in a slot 15 in the rod, there being pivotally engaged with the lever 11 at that side of its fulcrum remote from the link 10 the rod 16 of a piston adapted to work in an air-cylinder 17, fixed beneath the car.

Journaled in suitable bearings at the end of the car is a rotary brake-shaft 18, provided at its upper end with a hand-wheel 19 and at its lower end with a pinion 20 in mesh with a segmental rack 21, pivoted at 22 in a suitable bearing 23 beneath the car and pivotally connected with the forward end of the traction-rod 13, there being fixed to the bearing 23 in advance of the pivot 22 a spring-stop 24 for limiting the rearward movement of the rack 21 and attendant parts under the influence of a weight 25, slidably mounted upon vertical guides 26 and connected with the rack 21 by a flexible cord or element 27, adapted to travel between its ends over a guide-pulley 28, said weight serving to return the parts to normal position after operation by the shaft 18.

The brake-rod 13 comprises a front section 29 and a rear section 30, of which the latter is provided at its forward end with a series of longitudinally-spaced teeth 31, adapted for engagement with a transverse coupling member or pin 32, fixed in the rear end of a longitudinal slotted head 33, provided on the rear end of the section 29, the head 33, which has a slot 34 to receive the toothed portion or section 30, having its side portions terminating at their rear ends in downturned bearing-fingers 35 to guide the section 31 during adjustment of the parts, it being understood that under this construction the length of the rod 13 may be varied, as circumstances require, by engaging different ones of the teeth 31 with the coupling-pin 32.

In practice the parts stand normally in the position illustrated in Fig. 1, and when the shaft 18 is rotated in the direction indicated by the arrow in said figure the segmental rack 21 will be swung forwardly on its pivot, thereby exerting forward traction on the rod 13 for swinging the power-lever 11 on its pivot and acting through the link 10 and levers 6 7 for moving the brakes to braking position and at the same time lifting the weight 25, which will when the shaft 18 is released return the parts to normal position, it being understood that the return movement of the parts will be limited by the spring-stop 24. When it is desired to operate the mechanism automatically, air or steam is admitted in the usual manner to the cylinder 17 for moving the piston therewith, which acts through its rod 16 to swing the lever 11 on its fulcrum and move the brakes, as before explained, it being apparent that during this operation of the parts the lever 11 may move independently of the rod 13 and its operating mechanism, owing to the pin 14 traveling in the slot 15.

Having thus described my invention, what I claim is—

1. In a device of the class described, a brake-beam, a power-lever operatively connected therewith, an oscillatory toothed member, a rotary shaft having a pinion in mesh with said member and a traction-rod connecting the toothed member and lever, said rod comprising a pair of sections adjustably connected one with the other.

2. In a device of the class described, a brake-beam, a power-lever operatively connected therewith, a toothed oscillatory member, a brake-shaft having a pinion in mesh with said member, a traction-rod connected with the member and having a slot-and-pin connection with the lever, a cylinder, and a piston movable therein and operatively engaged with the lever.

In testimony whereof I affix my signature in presence of two witnesses.

STEPHEN MARCO.

Witnesses:
O. E. ANDERSON,
S. R. RISLEY.